Figure 1:
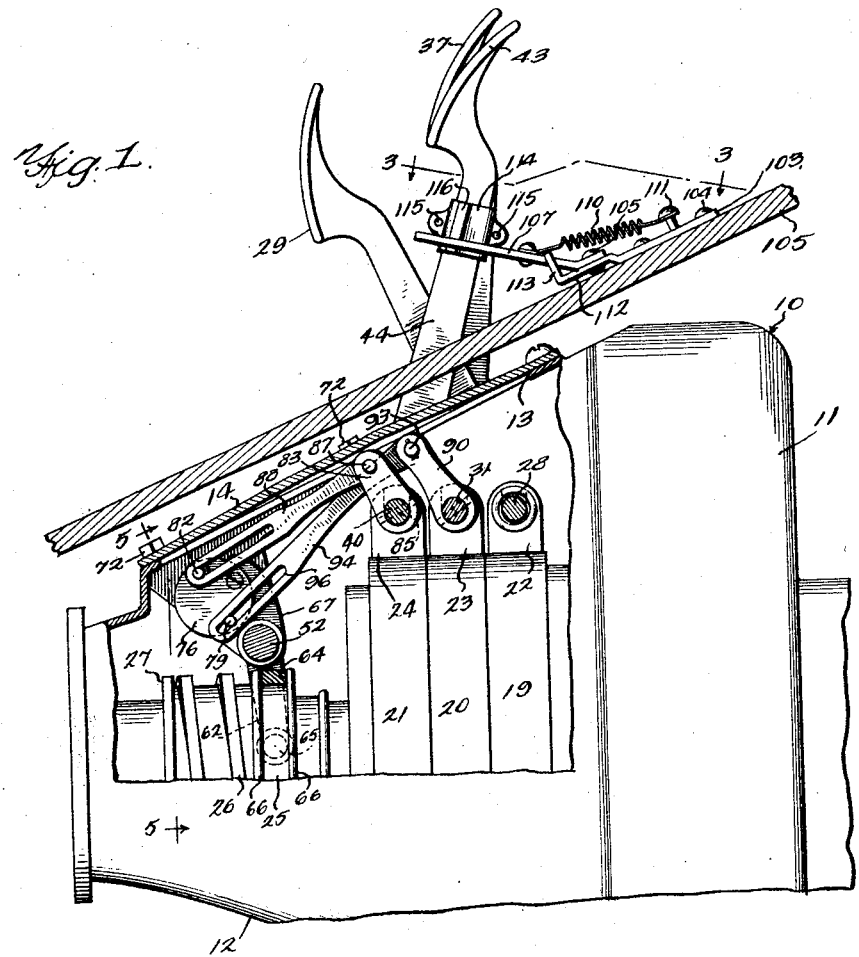

July 7, 1925.  
C. D. HALL  
TRANSMISSION ATTACHMENT  
Filed Jan. 31, 1925

1,544,745

3 Sheets-Sheet 1

Inventor
Cullen D. Hall,

By
Attorney

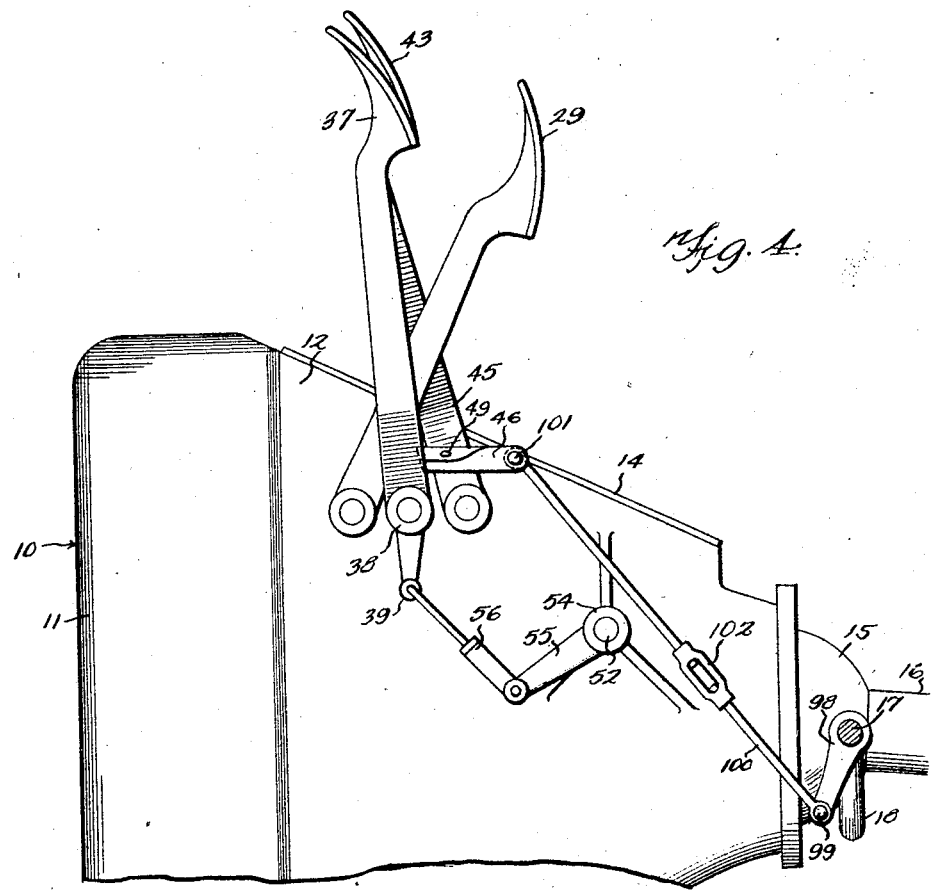
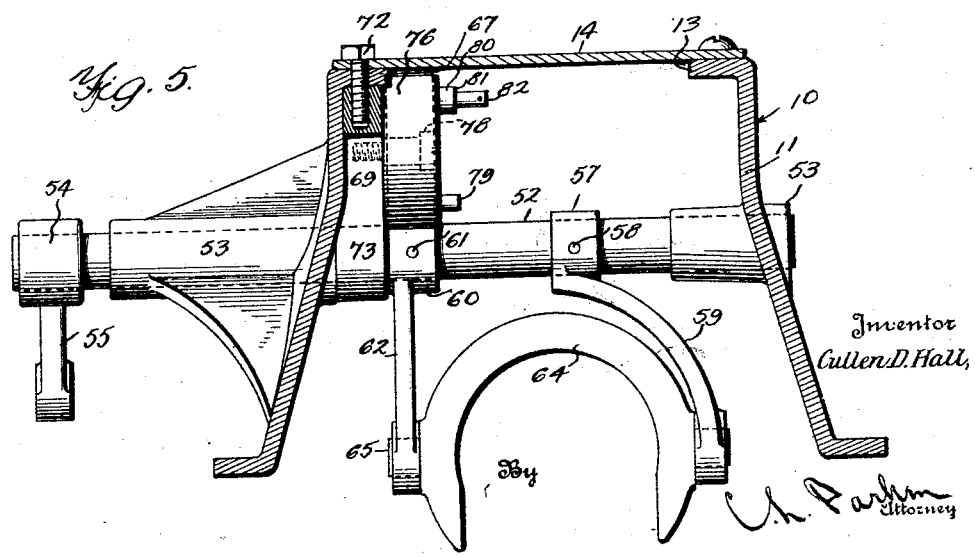

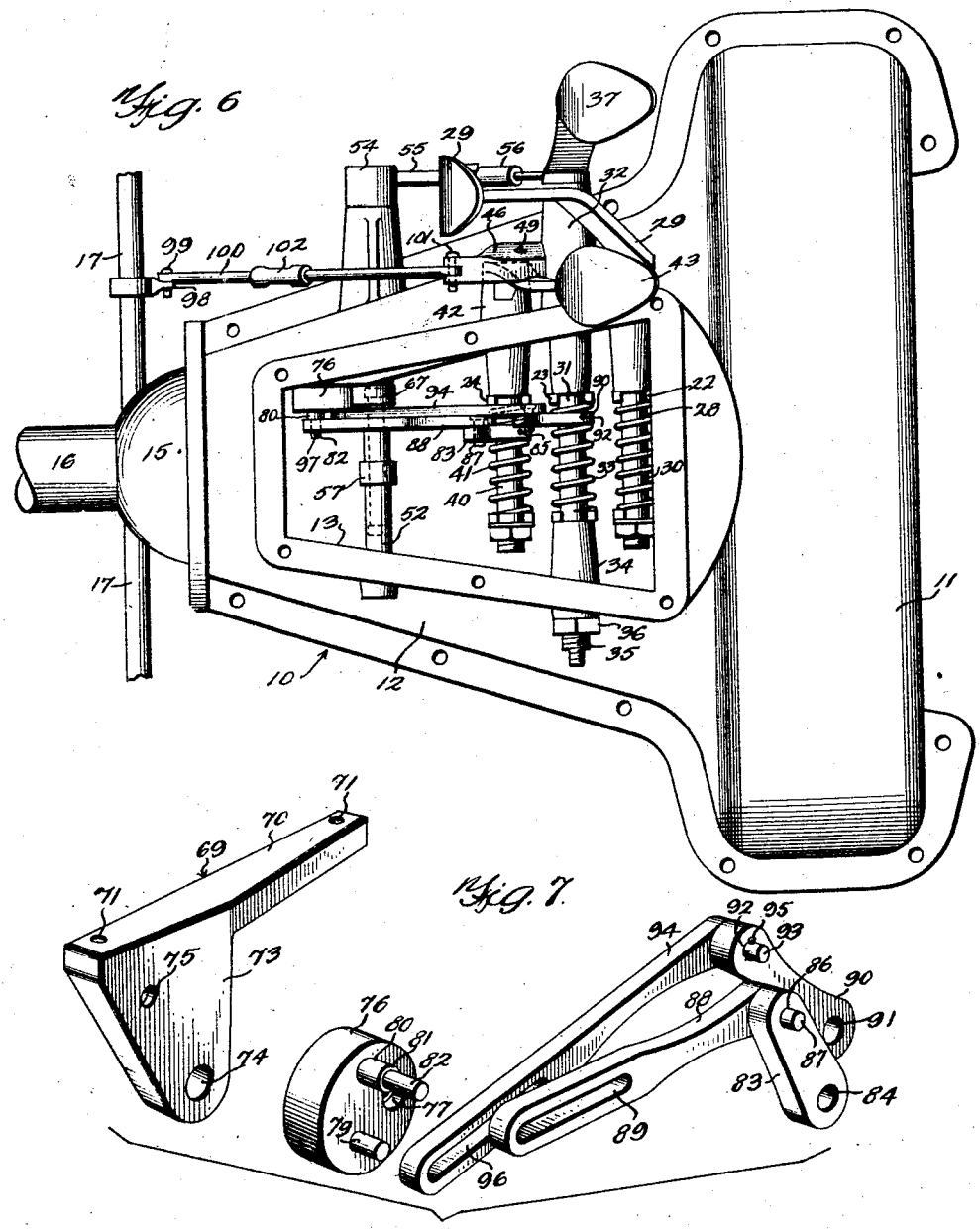

Patented July 7, 1925.

1,544,745

UNITED STATES PATENT OFFICE.

CULLEN D. HALL, OF FORT MYERS, FLORIDA, ASSIGNOR OF ONE-HALF TO SAMUEL E. WILLIAMS, OF FORT MYERS, FLORIDA.

TRANSMISSION ATTACHMENT.

Application filed January 31, 1925. Serial No. 5,990.

*To all whom it may concern:*

Be it known that I, CULLEN D. HALL, a citizen of the United States, residing at Fort Myers, in the county of Lee and State of Florida, have invented certain new and useful Improvements in Transmission Attachments, of which the following is a specification.

This invention relates to transmission attachments and more particularly to an attachment for the planetary transmissions of Ford automobiles.

An important object of the invention is to provide an attachment by means of which the entire transmission operation of the vehicle may be carried out without using the emergency brake lever whereby the latter may be eliminated and the lever slot closed.

A further object of the invention is to provide a device of the above mentioned character wherein the service and emergency brakes both are adapted to be operated by the usual service brake pedal, means being provided for placing the low and high speed elements in neutral position automatically when the brake pedal is depressed.

A still further object is to provide such a construction for placing the high and low speed elements in neutral position by the operation of the brake pedal that the transmission elements will remain in neutral position when the vehicle is brought to a stop and the brake pedal released.

A still further object is the provision of means connected between the high and low speed elements whereby the depression of the low speed pedal places the high speed elements in a position for operation but will prevent the operation thereof until the low speed pedal is released.

A still further object is to provide connections between the service brake pedal and the emergency brake operating shaft so that both brakes will be simultaneously operated when the brake pedal is depressed.

A still further object is to provide means for holding the brake pedal in depressed position when the vehicle is stopped on a hill to prevent movement of the vehicle when the foot is released from the brake pedal.

Other objects and advantages of the invention will be apparent during the course of the following description.

Figure 2:
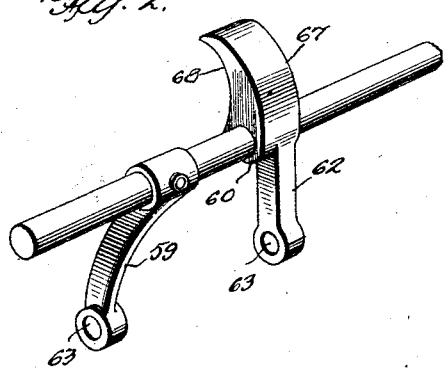
Figure 3:
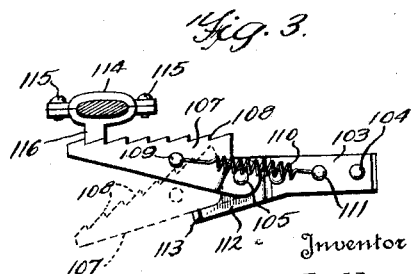

In the drawings I have shown one embodiment of the invention. In this showing,

Figure 1 is a side elevation of a portion of a transmission case and associated elements, parts being broken away, Figure 2 is a detail perspective view of a portion of the high speed operating mechanism, Figure 3 is a section on line 3—3 of Figure 1, Figure 4 is a side elevation of a portion of the transmission housing looking from the opposite side, Figure 5 is a section on line 5—5 of Figure 1, parts being omitted, Figure 6 is a plan view of the transmission housing and associated elements with the cover plate removed, parts being omitted, Figure 7 is a detail perspective view of portions of the operating mechanism detached, and, Figure 8 is a detail perspective of the connecting block for the emergency brake operating means.

Referring to the drawings the numeral 10 designates as a whole the transmission housing of a Ford automobile having an enlarged portion 11 at its forward end in which the usual fly-wheel (not shown) is mounted. The housing 10 is provided with a rear portion 12 in which the transmission elements are mounted and this portion is provided in its upper face with the usual opening 13 covered by the usual plate 14. Power is delivered from the transmission casing through a universal joint 15 and power shaft 16. A transverse emergency brake operating shaft 17 extends across the vehicle and is provided with a central depressed portion 18 which passes beneath the universal joint, as shown in Figure 4.

The transmission housing is provided with the usual reverse operating drum 19, low speed drum 20 and brake drum 21. The usual transmission and brake bands surround these drums and engage therewith as will be understood. The bands surrounding the three drums mentioned are provided with the usual operating lugs 22, 23 and 24 respectively, as shown in Figures 1 and 6. The usual high speed clutch (not shown) is arranged within the brake drum 21 in the usual manner and is adapted to be operated by a sliding collar 25 normally projected forwardly to engaging position by a heavy coil spring 26, the rear end of which engages a shoulder 27.

A transverse shaft 28 extends through the housing 10 as shown in Figures 1 and 6, and a pedal 29 is rigidly connected to this shaft outwardly of the casing. A spring 30 surrounds the shaft 28 intermediate the lugs 22 to normally spread the lugs when the pedal 29 is in normal position as shown in Figures 1 and 6. The movement of the vehicle is adapted to be reversed upon depression of the pedal 29 in the usual manner as will be understood. A second transverse shaft 31 is arranged parallel to the shaft 28 and is journaled in the bearing 32 formed integral with the transmission housing. The shaft 31 passes through the lugs 23 and is surrounded between the lugs by a coil spring 33. One end of the shaft 31 passes through a bearing 34 and is screw-threaded on its outer end as at 35 to receive a lock nut 36. The opposite end of the shaft 31 is provided with an operating pedal 37, depression of which is adapted to move the lugs 23 together to clamp the low speed band about the drum 20 to drive the vehicle forward in low speed as will be obvious. The pedal 37 is provided at its lower end with a collar 38 which is rigidly connected to the shaft 31 and this collar is provided with an integral depending member 39 for a purpose to be described. A brake operating shaft 40 is arranged parallel to the shaft 31 rearwardly thereof as shown in Figures 1 and 6. This shaft extends through the lugs 24 and is provided with the usual coil spring 41 arranged between the lugs. The outer end of the shaft extends to the exterior of the casing through a bearing 42 and is provided with an operating pedal 43 connected thereto by a shank portion 44. As shown in Figures 4 and 6, the shank portion has an outwardly and downwardly extending angular portion 45 to which is secured a block 46. Referring to Figure 8, it will be seen that the block 46 is provided with an angular cut out portion 47 adapted to be arranged against the angular portion 45 of the pedal shank and is provided adjacent this cut out portion with an opening 48 to receive a pin 49 by means of which the block 46 may be rigidly secured to the pedal shank. The block 46 extends rearwardly of the pedal shank and is provided with a pair of arms 50 apertured as at 51 for a purpose to be described.

The usual means are provided for engaging and disengaging the high speed clutch. As shown a transverse shaft 52 is journaled in bearings 53 formed integral with the housing 10 and the bearing extends entirely through the housing, one end of the shaft being provided with a collar 54 having a downwardly and forwardly extending arm 55. An adjustable link 56 is connected between the lower ends of the arms 39 and 55, as shown in Figure 4, for a purpose to be described. A collar 57 is secured by a pin 58 to the shaft 52 within the housing 10 and a curved arm 59 is formed integral with the collar 57, as shown. Referring to Figure 5, it will be seen that a second collar 60 is secured by a pin 61 to the shaft 52 in spaced relation to the collar 57. The collar 60 is provided with a depending arm 62 and the lower ends of the arms 59 and 62 are provided with alined openings 63. A yoke 64 is arranged between the arms 59 and 62 and is provided with diametrically opposite trunnions 65 journaled in the openings 63. As shown in Figure 1, the yoke 64 is adapted to embrace the sleeve 25 between flanges 66 thereon whereby movement of the yoke parallel to the axis of the transmission shaft is adapted to move the yoke rearwardly against the tension of the spring 26 to disengage the high speed clutch in the usual manner. As shown in Figures 1 and 2, the collar 60 is provided with an upstanding arm 65 having an arcuate rear face 68 for a purpose to be described.

Referring to Figure 7, the numeral 69 designates a bearing bracket adapted to be mounted within the transmission housing as shown in Figure 5. The bracket 69 is provided with an upper face 70 provided with openings 71 adapted to receive the lower screw-threaded ends of bolts 72. The bolts 72 also pass through the casing 14 to assist in maintaining the latter in position. The bracket 69 is further provided with a depending portion 73, the inner face of which is arranged substantially at right angles to the axes of the shafts 28, 31 and 40. The lower end of the depending portion 73 is provided with an opening 74 which receives the shaft 52 as shown in Figure 5. The extension 73 is further provided above the opening 74 with a screw-threaded opening 75.

A preferably circular cam 76 is adapted to be arranged against the inner face of the depending portion 73, as shown in Figure 5. The cam 76 is provided with an eccentric opening 77 adapted to receive the head 78 of a pivot pin. The pivot pin extends through the cam and is threaded into the opening 75 to pivotally support the cam against the bracket 69. Rearwardly of the opening 77 and below the line thereof the cam 76 is provided with a laterally extending pin 79 for a purpose to be described. The cam is provided opposite the pin 79 with a second pin 80 having a shoulder 81 preferably spaced from the face of the cam a distance substantially equal to the length of the pin 79. The pin is provided with an outwardly extending reduced portion 82 substantially equal in diameter to the pin 79. The curvature of the outer face of the cam 76 corresponds to that of the face 68 of the arm 67 and the faces of these members are adapted to contact with each other as clearly shown in Figure 1.

Means are provided for rotating the cam 76 when the brake pedal 43 is depressed. As shown, a link 83 is provided in its lower end with an aperture 84 adapted to receive the shaft 40. The spring 41 is divided into two sections to permit the lower end of the link to encircle the shaft, as will be obvious. A pin 85 extends through the lower end of the link to rigidly secure it to the shaft 40. From the shaft 40 the link extends upwardly and rearwardly and is provided at its upper end with an opening 86 adapted to receive a pin 87 carried by the forward end of an arm 88. A slot 89 is provided in the rear end of the arm 88 as shown and this slot is adapted to receive the pin 82.

Means also are provided for rotating the cam 76 under certain conditions when the low speed pedal 37 is depressed. A link 90 is provided in its lower end with an opening 91 adapted to receive the shaft 31 and a pin 92 passes through the link and the shaft 31 to rigidly secure these members together. The spring 33 also is divided as in the case of the spring 41 to permit the lower end of the link 90 to encircle the shaft 31. The upper end of the link 90 is provided with an opening 92 to receive a pin 93 extending laterally from the forward end of an arm 94. A cotter pin 95 passes through the pin 93 to maintain the pin 93 in proper position as will be obvious. The arm 94 extends downwardly and rearwardly and is provided in its rear end with a longitudinal slot 96 adapted to receive the pin 79. With the parts in the position shown in Figure 1 it will be seen that the pin 79 is arranged a slight distance from the rear end of the slot 96 so that the cam 76 is adapted to rotate slightly in a clockwise direction without causing any movement of the arm 94. While I have provided a cotter pin 95 to maintain the pin 93 in proper position it has been found unnecessary to provide such means for the pin 87 since the head thereof will contact with an inner face of the arm 94 to prevent displacement of the pin 87. The pin 82 is preferably provided with a cotter pin 97 to prevent displacement of the arm 88 and the latter engaging against the arm 94 will prevent lateral displacement of this arm from the pin 79 as will be obvious.

As shown in Figure 4, an arm 98 is rigidly connected to the emergency brake shaft 17 and depends therefrom. The lower end of the arm 98 is pivotally connected as at 99 to the lower end of a link 100 and the forward end of this link is pivotally connected by a pin 101 passing through the openings 51 in the arms 50. The link 100 may be provided in two sections, the ends of which are joined by a turn buckle 102 to permit adjustment of the link 100 as will be obvious.

Means are provided for maintaining the brakes in engaged position when it is desired to leave the vehicle on an incline. As shown in Figures 1 and 3, a support 103 is connected as at 104 with the floor-board 105 of the vehicle. Near its rear end the plate is provided with a pivot pin 106 to which is pivotally connected the forward end of a latch member 107. As shown, the latch is provided in one edge with ratchet teeth 108. The latch is provided outwardly of the pivot pin 106 with a pin 109 to which is connected the forward end of a spring 110. The rear end of the spring is connected to a pin 111 secured to the plate 103 rearwardly of the pivot pin 105. The plate 103 is provided with an extension 112 having an upstanding arm 113 at its forward end to limit the outward movement of the latch 107 as will become apparent. The shank 44 of the pedal 43 is adapted to be embraced by a pair of complementary members 114 which are secured together by screws or the like 115. One of the members 114 is provided with a ratchet tooth 116 adapted to engage the teeth 108. It will be obvious that the arrangement of the spring to one side of the pivot 106 as shown in Figure 3 will serve to maintain the teeth 108 in engagement with the tooth 116. When it is desired to disengage these members the latch 107 may be moved to the dotted line position with the spring 110 on the opposite side of the pivot 106. In the dotted line position the spring will maintain the latch in engagement with the arm 113.

The operation of the device is as follows:

With the parts in the position shown in Figure 1, the lowest point of the cam 76 will be in engagement with the arm 67 and the spring 26 will maintain the high speed clutch in engaged position so that the machine will be driven forwardly in high speed. When it is desired to stop the vehicle the brake pedal 43 will be depressed in the usual manner. This action will operate the service brake by drawing the lugs 24 together to clamp the brake band about the drum 21. Simultaneously with this action the block 46 will draw the link 100 upwardly and forwardly rocking the shaft 17 through the arm 98 and applying the emergency brake. It will be obvious that distribution of wear between the service and emergency brakes will prolong the life of these members. When the brake 43 is depressed, the shaft 40 will rock in a clockwise direction as seen in Figure 1, swinging the arm 83 forwardly and rotating the cam 76 slightly in a clockwise direction by virtue of the engagement of the pin 82 in the end of the slot 89. This action will move the arm 67 forwardly a sufficient distance to disengage the high speed clutch and the complete forward movement of the arm 88 will move the pin 79 to the rear end of the slot 96. During this operation it is not necessary to hold the low speed pedal 37 in neutral position in order to throw out the high speed clutch. Thus it will be seen that both the high and low speed drives will be disengaged when the brake pedal is depressed. The pitch of the cam 76 is sufficient to prevent the automatic return to engaging position of the high speed clutch under the influence of the spring 26. When it is desired to start the vehicle the low speed pedal 37 will be depressed thus engaging the low speed band with the drum 20. This action will rock the shaft 31 drawing the arm 94 forwardly as will be understood. As previously described the application of the brake moves the pin 79 to the rear end of the slot 76 and thus it will be apparent that forward movement of the arm 94 will reverse the rotation of the cam 76 and return it to the position shown in Figure 1. While the low speed pedal is depressed however the high speed clutch is prevented from returning to engaging position by the mechanism connected between the shaft 31 and shaft 52 outwardly of the casing. It will be obvious that depression of the pedal 37 will swing the arm 39 rearwardly and the connection 56 will rotate the shaft 52 swinging the arm 67 rearwardly into engagement with the face of the cam. When sufficient vehicle speed has been attained through depression of the low speed pedal, the latter is released and the spring 26 projects the sleeve 25 forwardly to cause engagement of the high speed clutch. In order to use the reverse pedal 29 it is merely necessary to apply the brake to place the high and low speed drives in neutral position and since the brake practically always has been previously applied, no extra action is necessary when it is desired to depress the reverse pedal. Thus it will be seen that all the various transmission operations may be carried out through movements of the feet and the usual emergency brake pedal may be completely eliminated and the slot through which the lever extends may be closed to prevent cold air, dust, etc., from passing into the interior of the vehicle.

When the vehicle is used in flat countries it is not necessary to provide means for maintaining engagement of the brakes when the vehicle is left standing. Accordingly it is not always necessary to use the brake locking mechanism shown in Figure 3 of the drawings. If the vehicle is left standing in a level place the latch may be left in the position shown in dotted lines in Figure 3. If the vehicle is left standing on an incline it is merely necessary to swing the latch 107 to the solid line position shown in Figure 3, whereupon depression of the brake pedal will cause the tooth 116 to engage one of the teeth 108 toward the forward end of the latch 107. The position at which the tooth 116 will engage the latch will depend of course upon the condition of the brakes. When new brake bands are employed and properly adjusted it will be obvious that the brake pedal will not move forwardly as far as when the bands have become worn. The provision of a series of teeth 108 serves to grip the brake pedal in any position when it is depressed.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. The combination with an automobile transmission having high and low gear and brake operating mechanisms, of connections between the brake and high gear operating mechanisms for moving the latter to neutral position when the brake operating mechanism is actuated, means controlled by said low gear operating mechanism for rendering said connections inoperative when the low gear operating mechanism is actuated, and means connected between said low and high gear operating mechanisms for preventing operation of the latter while said low gear operating mechanism is in operative position.

2. The combination with an automobile transmission having high gear operating mechanism normally projected to operative position, low gear operating mechanism normally projected to inoperative position, and brake operating mechanism, of connections between said brake and high gear operating mechanisms for moving the latter to and holding it in neutral position when said brake operating mechanism is actuated, means connected between said high and low gear operating mechanisms for rendering said connections inoperative upon actuation of said low gear operating mechanism, and separate means connected between said high and low gear operating mechanisms for holding the former in neutral position while the latter is being operated.

3. The combination with an automobile transmission having high and low gear and brake mechanisms, an operating shaft connected to each of said mechanisms, connections between the brake and high gear shafts for moving the latter to and holding it in neutral position when said brake shaft is operated, said connections including a rotatable cam controlling the high gear shaft and normally arranged to permit operation of the high gear mechanism, means connected between the low gear shaft and said cam for returning the latter to normal position when the low gear shaft is operated, and means connected between the high and low gear shafts for holding the high gear shaft in neutral position independently of said cam when the low gear shaft is operated.

4. The combination with an automobile transmission having high and low gear and brake mechanisms, an operating shaft connected to each of said mechanisms, an arm connected to each of said shafts, a cam adapted upon rotation to engage the arm of the high gear shaft to move it to and hold it in neutral position, said cam being normally arranged to permit operation of the high gear shaft, a link connected between said cam and the arm of the brake shaft to rotate said cam upon actuation of the brake shaft, a link connected between the low gear shaft and said cam for returning the latter to normal position upon operation of the low gear shaft, and means connected between the high and low gear shafts for momentarily holding the former in neutral position while the latter is being operated.

5. The combination with an automobile transmission including a housing, high and low gear and brake operating mechanisms mounted in said housing, and an operating shaft connected to each of said mechanisms and extending through said housing, said low gear mechanism being normally inoperative, said high gear mechanism being normally operative, of a cam rotatably mounted in said housing, said high gear shaft being provided with an arm normally engaged by said cam and movable upon rotation thereof to move the high gear mechanism to and hold it in neutral position, said cam being normally arranged to permit operation of the high gear mechanism, an arm carried by the brake shaft, a link connected between said last named arm and said cam to rotate the latter upon actuation of the brake shaft, an arm carried by the low gear shaft, a link connected between said last named arm and said cam for returning the latter to normal position upon actuation of the low gear shaft, and means connected between the low and high gear shafts outwardly of said housing for momentarily holding the high gear shaft in neutral position during actuation for the low gear shaft.

6. The combination with an automobile transmission including a housing, high and low gear and brake mechanisms mounted in said housing, and an operating shaft connected to each of said mechanisms and extending through said housing, said low gear mechanism being normally inoperative, said high gear mechanism being normally operative, of a cam rotatably mounted in said housing, said high gear shaft being provided with an arm normally engaged by said cam and movable upon rotation thereof to move the high gear mechanism to and hold it in neutral position, an arm carried by the brake shaft, a link pivotally connected at its forward end to said arm, the opposite end of said link being arranged adjacent said cam and provided with a longitudinal slot, said cam being provided with a pin arranged in said slot, an arm carried by the low gear shaft, a link pivotally connected at its forward end to said last named arm, said last named link having its opposite end arranged adjacent said cam and provided with a slot, said cam being provided with a second pin adapted to be arranged in said last named slot, and means connected between the low and high gear shafts outwardly of said housing for momentarily holding the high gear shaft in neutral position during operation of the low gear shaft.

7. The combination with an automobile transmission including a housing, high and low gear and service brake operating mechanisms mounted in said housing, emergency brake operating mechanism arranged outwardly of said housing, an operating shaft connected to each of said mechanisms, said high and low gear mechanisms being normally operative and inoperative respectively, of a cam rotatably mounted in said housing, said high gear shaft being provided with an arm normally engaged by said cam and movable upon rotation thereof to move the high gear mechanism to and hold it in neutral position, said cam being normally arranged to permit operation of the high gear mechanism, an arm carried by the brake shaft, a link connected between said last named arm and said cam to rotate the latter upon actuation of the brake shaft, an arm carried by the low gear shaft, a link connected between said last named arm and said cam for returning the latter to normal position upon actuation of the low gear shaft, means connected between the low and high gear shafts outwardly of the casing for holding the latter in neutral position during operation of the low gear shaft, and means connected between the emergency brake shaft and service brake shaft for operating the former automatically upon operation of the service brake shaft.

8. The combination with an automobile transmission including a housing, high and low gear and brake operating mechanisms mounted in said housing, an operating shaft connected to each of said mechanisms and extending through said housing, and pedals connected to the low gear and brake shafts, said low gear mechanism and said high gear mechanism being normally inoperative and operative respectively, of a cam rotatably mounted in said housing, said high gear shaft being provided with an arm normally engaged by said cam and movable upon rotation thereof to move the high gear mechanism to and hold it in neutral position, said cam being normally arranged to permit operation of the high gear mechanism, an arm carried by the brake shaft, a link connected between said last named arm and said cam to rotate the latter upon actuation of said brake shaft, an arm carried by the low gear shaft, a link connected between said last named arm and said cam for returning the latter to normal position upon actuation of the low gear pedal, means connected between the high and low gear shafts outwardly of said housing for momentarily holding the former in neutral position during operation of the low gear shaft, and manually controlled means adapted to engage the brake pedal for maintaining the brake mechanism in operation.

9. The combination with an automobile transmission including a housing, high and low gear and brake operating mechanisms mounted in said housing, an operating shaft connected to each of said mechanisms and extending through said housing, and a pedal connected to said brake shaft, said high and low gear mechanisms being normally operative and inoperative respectively, of a cam rotatably mounted in said housing, said high gear shaft being provided with an arm normally engaged by said cam and movable upon rotation thereof to move the high gear mechanism to and hold it in neutral position, said cam being normally arranged to permit operation of the high gear mechanism, an arm carried by the brake shaft, a link connected between said last named arm and said cam to rotate the latter upon actuation of the brake shaft, an arm carried by the low gear shaft, a link connected between said last named arm and said cam for returning the latter to normal position upon actuation of the low gear shaft, means connected between the high and low gear shafts outwardly of said housing for holding the former in neutral position only during operation of the low gear shaft, a pivoted latch arranged adjacent the brake pedal and provided with ratchet teeth, a tooth carried by the brake pedal and adapted to engage said ratchet teeth, and means for selectively holding said latch with the ratchet teeth thereof in and out of engagement with said tooth.

10. The combination with an automobile transmission including a housing, high and low gear and brake mechanisms mounted in said housing, and an operating shaft connected to each of said mechanisms and extending through said housing, said high and low gear mechanisms being normally operative and inoperative respectively, of a bracket secured in said housing and provided with an opening, a cam arranged adjacent said bracket and provided with an eccentric opening, a pivot pin passing through the opening in said cam and secured in the opening in said bracket, said high gear shaft being provided with an arm normally engaged by said cam and movable upon rotation thereof to move the high gear mechanism to and hold it in neutral position, said cam being normally arranged to permit operation of the high gear mechanism, an arm carried by the brake shaft, a link pivotally connected at its forward end to said arm, the opposite end of said link being arranged adjacent said cam and provided with a longitudinal slot, said cam being provided with a pin arranged in and normally engaging against the rear end of said slot, an arm carried by the low gear shaft, a link pivotally connected at its forward end to said last named arm, said last named link having its opposite end arranged adjacent said cam and provided with a slot, said cam being provided with a second pin arranged in said last named slot and spaced from the rear end thereof, said pins being arranged on opposite sides of the pivot pin of said cam, and means connected between the high and low gear shafts outwardly of said housing for holding the high gear shaft in neutral position only during operation of the low gear shaft.

In testimony whereof I affix my signature.

CULLEN D. HALL.